(12) United States Patent
Fasel et al.

(10) Patent No.: US 6,378,932 B1
(45) Date of Patent: Apr. 30, 2002

(54) MOTOR VEHICLE WITH FLOW-INFLUENCING DEVICES TO REDUCE AIR RESISTANCE

(75) Inventors: Hermann Fasel, Tucson, AZ (US); Albert Hack, Graz (AT); Ralf Rossmanith, Oberstenfeld (DE); Jörg Russow, Grafenau (DE); Volker Schwarz, Altbach (DE); Rainer Tiefenbacher, Steinenbronn (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/531,693

(22) Filed: Mar. 20, 2000

(30) Foreign Application Priority Data

Mar. 18, 1999 (DE) .......................................... 199 12 140

(51) Int. Cl.⁷ .................................................. B60J 9/00
(52) U.S. Cl. ............................... 296/180.5; 296/180.1; 180/903
(58) Field of Search .................... 296/180.1, 180.2, 296/180.3, 180.5; 180/903

(56) References Cited

U.S. PATENT DOCUMENTS

| | | | |
|---|---|---|---|
| 2,737,411 A | 3/1956 | Potter | 296/1 |
| 4,660,879 A * | 4/1987 | Kobayahi et al. | 296/180.5 |
| 4,682,808 A | 7/1987 | Bilanin | 296/1 S |
| 4,810,022 A * | 3/1989 | Takagi et al. | 296/180.5 |
| 4,925,236 A | 5/1990 | Itoh et al. | 296/180.5 |
| 5,058,945 A | 10/1991 | Elliott, Sr. | 296/180.5 |
| 5,061,007 A * | 10/1991 | Simpson | 296/180.5 |
| 5,090,766 A * | 2/1992 | Ito et al. | 296/180.5 |
| 5,209,438 A | 5/1993 | Wygnanski | 244/203 |
| 5,289,997 A | 3/1994 | Harris | 244/130 |
| 5,429,411 A * | 7/1995 | Spears | 296/180.1 |
| 5,454,619 A * | 10/1995 | Haraway | 296/180.1 |
| 5,863,090 A * | 1/1999 | Englar | 296/180.1 |
| 5,908,217 A * | 6/1999 | Englar | 296/180.1 |

FOREIGN PATENT DOCUMENTS

| | | |
|---|---|---|
| DE | 2 212 952 | 9/1973 |
| DE | 38 28 752 | 3/1990 |
| DE | 38 37 729 | 5/1990 |
| EP | 0 698 546 | 2/1996 |
| GB | 2 295 587 | 6/1996 |
| JP | 9-118270 | 5/1997 |
| WO | WO 95/19287 | 7/1995 |

* cited by examiner

Primary Examiner—Stephen T. Gordon
Assistant Examiner—Lori L Coletta
(74) Attorney, Agent, or Firm—Crowell & Moring LLP (57) ABSTRACT

A motor vehicle has an outer contour around which the headwind flows when driving has associated with it flow-influencing structure to reduce the air resistance of the motor vehicle is known. The flow-influencing structure are movably mounted in a vicinity of the outer contour and can be activated periodically with the aid of drive devices in order to introduce suitably time-dependent disturbances into the flow of the headwind in the vicinity of the flow-influencing structure.

1 Claim, 6 Drawing Sheets

MOTOR VEHICLE WITH FLOW-INFLUENCING DEVICES TO REDUCE AIR RESISTANCE

BACKGROUND AND SUMMARY OF THE INVENTION

This application claims the priority of German Application No. 199 12 140.0-21, filed Mar. 18, 1999, the disclosure of which is expressly incorporated by reference herein.

The invention relates to a motor vehicle with an outer contour on which flow-influencing means are located to reduce the air resistance of the motor vehicle.

A motor vehicle of this type is known from U.S. Pat. No. 4,682,808. To reduce the air resistance of a motor vehicle with a fastback, preferably a commercial vehicle, various suggestions for mounting rigidly secured air guide elements in the trunk area are provided which influence the flow in the wake in the trunk area of the motor vehicle.

It is also known (German Patent Document DE 38 37 729 A1—corresponding to U.S. Pat. No. 5,407,245) to provide ejection and suction devices in the trunk area to reduce the flow resistance of a motor vehicle, with the ejection device producing a constant blast of air at high speed and the suction device producing constant suction of suitably deflected air in the eddy current area. The ejection and suction devices are combined with each other with one blower serving both to draw in air and to blow it out.

In an area in a different species, aircraft construction, it is known from U.S. Pat. No. 5,209,438 to provide oscillating movable disturbing elements in the wall boundary layer area of the flow around a wing in order to increase the lift of the wing. Alternatively, this patent provides for the oscillating application of disturbing elements to raise the divergence angle in a diffuser.

The goal of the invention is to provide a vehicle of the type recited at the outset that has an air resistance when driving that is reduced relative to the prior art.

This goal is achieved by the fact that means for influencing at least a coherent vortex structure in the vicinity of the outside flow around the vehicle have flow-influencing means. As a result, it is possible to considerably reduce the air resistance of the motor vehicle when driving. This measure also makes it possible to lower the fuel consumption of the vehicle. The invention is based on the fact that in blunt body areas of the motor vehicle, especially in the area of the trunk, but also in the rear areas of outside mirrors or similar blunt body areas, in which non-steady-state vortex structures appear in the separated outside flow area lead to a pressure drop downstream from the particular body area and thus lead to an increase in resistance.

In a rear area of the motor vehicle, the separated flow essentially forms so-called wake flow that is turbulent even at low speeds. Wake flow can also be spoken of in connection with body areas that are blunt at the rear. The more energetic the vortex structures in the wake, the greater the resultant air resistance. Such turbulent flows can have coherent structures in which the majority of the kinetic energy of the flow is concentrated. Such coherent vortex structures in the turbulent vortex flow lead to corresponding pressure drops. Thus, according to the invention, the coherent vortex structures are critical for the pressure drag and hence for a significant portion of the entire air resistance of a motor vehicle. The coherent vortex structures appear as a consequence of hydrodynamic instabilities in a statistically averaged basic flow. Appropriate means to influence these coherent vortex structures can alter the basic flow, so that the entire dynamics can be changed and a more energetically favorable flow around the motor vehicle can be achieved. This is turn results in a reduction of air resistance.

It has proven to be especially advantageous to introduce controlled time-dependent disturbances into the wake flow to reduce the intensity of the existing coherent vortex structures or to shift the development of these structures further downstream of the respective body area, especially the trunk. By deliberately introduced disturbances with the aid of the influencing means, coherent structures can appear at different dominant frequencies than in the natural wake. By introducing large amplitude disturbances the statistically averaged wake flow can be changed so that the average wake flow is more stable in the hydrodynamic sense and the creation of energetic coherent structures in the natural wake can be prevented or reduced or displaced in space.

Additionally or alternatively, it is advantageous to produce controlled time-dependent disturbances in the wall boundary layers in order to prevent separation of the flow in areas with positive pressure gradients in the flow direction. By introducing the disturbances, the energy exchange between the layers near the wall and the external flow can be considerably improved. Thus, adjacent flows with much greater pressure gradients in the main flow direction than in the undisturbed case can be produced. By using clear intakes with increased pressure gradients, greater pressure recovery and hence a reduced air resistance can be obtained up to the vehicle trunk. In addition, the statistically averaged wake flow that then appears in the wake is hydrodynamically less unstable, so that fewer intensive coherent structures appear in the wake and the air resistance is reduced further.

In certain preferred embodiments of the invention, the flow-influencing means are located movably in the vicinity of the outer contour and can be activated periodically with the aid of drive devices in order to introduce, time-dependent disturbances in the vicinity of the flow-influencing means into the relative wind flow. This design ensures further improved hydrodynamics and hence energetically more favorable flow around the motor vehicle. Since the flow-influencing means can be activated by the drive devices, the flow around the motor vehicle can be influenced actively. The provision of essentially stationary flow-influencing means on the other hand, as are known from the prior art, constitutes a passive measure to influence the flow around the motor vehicle which is not comparable with the solution according to the invention and with the design described.

In certain preferred embodiments of the invention, the drive devices include a control unit that changes the periodic activation of the flow-influencing means as a function of the speed of the motor vehicle. It is therefore possible to adjust the frequency of activation of the flow-influencing means to the respective flow rate of the relative wind and to the flow of air around the motor vehicle, so that air resistance can be reduced at all road speeds.

In certain preferred embodiments of the invention, the periodically activatable flow-influencing structure are combined with passive flow guide means in the vicinity of the outer contour. Passive flow guide structure as well as the periodically activatable flow-influencing means can be provided in both the trunk area and in the other areas of the outer contour of the motor vehicle. By a combination of active and passive measures to influence the flow of air around the vehicle, further reduction of the air resistance can be achieved.

In certain preferred embodiments of the invention, the periodically activatable flow-influencing devices are located in a trunk area of the motor vehicle to disturb wake flow. By introducing disturbances which are controlled and time-dependent into the wake flow, it is possible to reduce the intensity of existing vortex structures or to shift the development of such vortex structures further downstream of the motor vehicle trunk. It is also possible by introducing large-amplitude disturbances to change a statistically averaged wake flow so that the corresponding wake flow is more stable in the hydrodynamic sense and the development of high energy coherent structures in the natural wake is prevented, reduced, or spatially shifted.

In certain preferred embodiments of the invention, the periodically activatable flow-influencing means are in the outer contour areas located in front of the trunk area to disturb separation of the boundary layers of the flow around the vehicle. It is therefore possible to prevent separation of the flow around the vehicle in areas with a positive pressure gradient in the flow direction. By providing disturbances, the energy exchange between layers close to the wall and an external flow around the vehicle can be considerably improved. The influence on the wall boundary layers in the outer contour areas of the motor vehicle also guarantees change in the natural wake flow in the trunk area, with the modified wake flow having a higher stability hydrodynamically. The design therefore guarantees a reduction in air resistance by increasing the pressure in the main flow direction upstream of the end of the motor vehicle as well as a positive change in the wake flow so that the air resistance can be further reduced.

In certain preferred embodiments of the invention, a plurality of flow-influencing means are distributed over the rear area of the trunk that can be activated periodically in or out of phase with one another. Activation can then take place in such fashion that circulating disturbances can be produced.

In certain preferred embodiments of the invention, at least one movably mounted dimensionally stable air guide element is provided as the flow-influencing means. This is a design that can be realized simply.

In certain preferred embodiments of the invention, blowing and/or suction devices are provided as flow-influencing means whose ejection and/or intake openings are integrated into the outer contour. These suction openings can have a number of different shapes, especially circular or angular openings or narrow slots. These openings can also be covered by membranes so that the ejection and/or intake devices do not use air flows directly to produce disturbances but only for bellows-like actuation and movement of correspondingly flexible membranes. The membranes however can also be made permeable to air so that air flows result that can be blown out and drawn in.

Other objects, advantages and novel features of the present invention will become apparent from the following detailed description of the invention when considered in conjunction with the accompanying drawings.

DETAILED DESCRIPTION OF THE DRAWINGS

Figure 1:
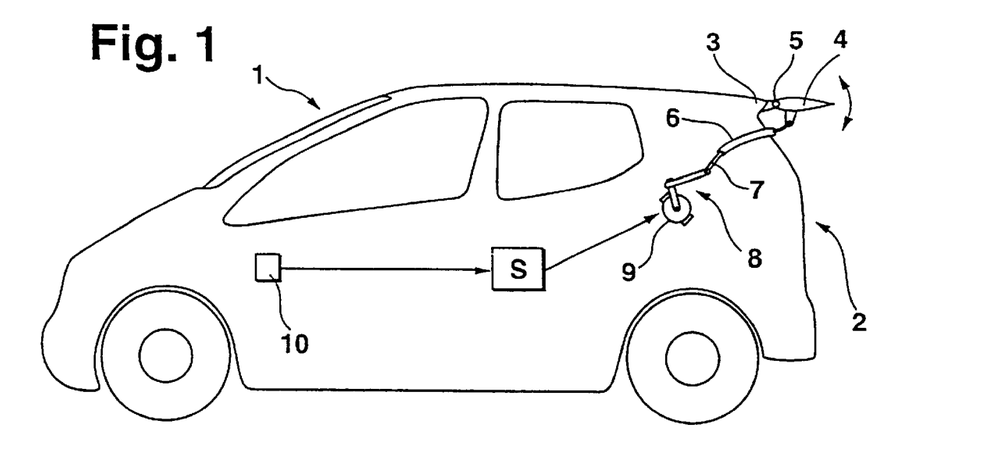
FIG. 1 shows a first embodiment of a motor vehicle according to the invention schematically in a side view.
Figures 2, 3:
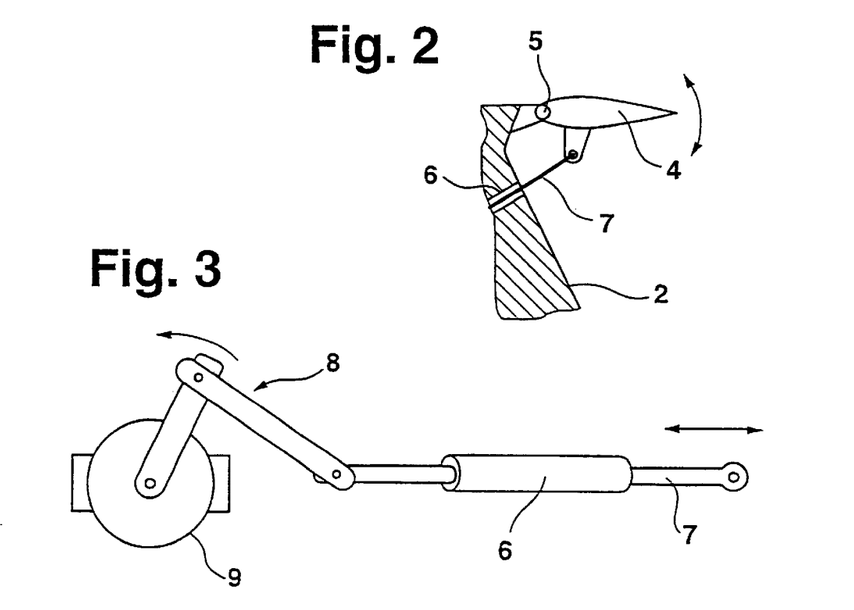
FIG. 2 shows an enlarged view of a portion of a trunk area of the motor vehicle according to FIG. 1.
FIG. 3 is an enlarged view of a drive unit for periodic pivoting movement of an air guide element according to FIG. 2.

A motor vehicle in the form of an automobile 1 according to FIG. 1 is provided with a trunk area 2 designed as a hatchback. At the transition from trunk area 2 to a roof area, an air guide edge 3 is provided as a passive flow-influencing structure. The edge 3 is part of the body of automobile 1. In addition, an active flow-influencing means in the form of a spoiler 4 is provided on edge 3 so that it can pivot around a horizontal pivot axis 5. The spoiler 4 is mounted so that it can be moved up and down periodically as automobile 1 is driven (see the direction of the arrow), while the frequency of the periodic pivoting movement of spoiler 4 is adjusted to the road speed of automobile 1. As the drive means for activating the periodic pivoting movement of spoiler 4, an electric motor 9 in the form of a stepping motor is provided which is articulated by means of a crank drive 8 (FIG. 3) through a Bowden cable 6, 7 to spoiler 4 (FIG. 2). Electric motor 9 that serves as the drive is continuously controllable by a control unit S integrated into automobile 1. Control unit S is connected with a road speed sensor 10 whose signals logging the current road speed are evaluated constantly by control unit S and control commands are issued to electric motor 9 appropriately. Control unit S is provided with a data memory which assigns disturbing frequencies for spoiler 4 at certain flow rates of the air flow around the vehicle. Depending on the respective road speed and the resultant flow of the headwind around the vehicle, a corresponding change is made in the frequency of the pivoting movement of spoiler 4.

In a manner not shown it is also possible to change the amplitude of the periodic pivoting movement of spoiler 4 as a function of road speed. In this case, drive means are provided by which the pivot angle of spoiler 4 can be varied.

Figure 4:
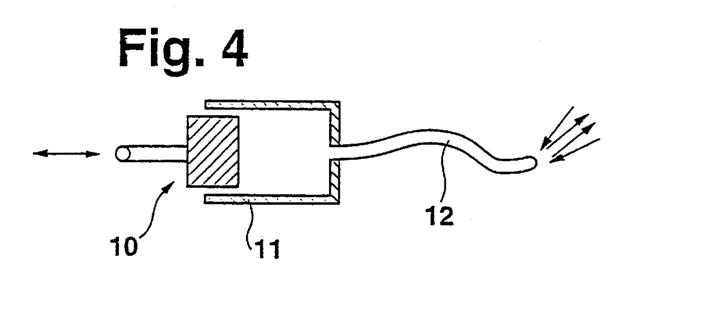
FIG. 4 is another drive unit of a blowing and sucking device that serves as flow-influencing means.

The drive unit formed by electric motor 9 and crank drive 8 can similarly be used for activation of additional flow-influencing means that are associated in a manner described further below with the outer contour of a motor vehicle as intake and blower elements. Crank drive 8 engages a piston rod of a piston 10 according to FIG. 4 that is linearly movably mounted in an intake and blower cylinder 11. A hose 12 is connected endwise to intake and blower cylinder 11, with the open end of the hose at a suitable point on the outer contour of the motor vehicle forming a corresponding air blower and suction opening. Corresponding pump movements of piston 10 caused by crank drive 8 and electric motor 9 thus produces periodic alternating suction and blowing processes in the area of the corresponding outer contour opening. By drawing in and blowing out air in the outer contour area of the motor vehicle in the same manner as in the periodic mobility of an air guide element, an active influence is exerted in the flow around the motor vehicle which can be varied as a function of road speed in the same way.

The designs described here for periodic activation of corresponding flow-influencing means are selected only as examples without having a limiting effect. Of course, drive means are provided that are different in design and structure for periodic activation of the flow-influencing means.

Various suitable arrangements and designs of active flow-influencing means are then shown with reference to a plurality of embodiments of the invention, some of which are combined with passive flow structure. According to the invention, all of the active flow-influencing means shown can be combined with any suitable passive flow-influencing structure. In particular, the active flow invention can be combined with suitable embodiments of passive flow-influencing means on motor vehicles as they are known from U.S. Pat. No. 4,682,808.

The embodiments below showing the arrangement and design of active flow-influencing means are illustrated without the corresponding drive units for periodic activation of these flow-influencing means. Depending on the design of these flow influencing means, they are provided with drive units according to FIGS. 1 to 4 or with other oscillating drive means as described previously.

Figure 5:
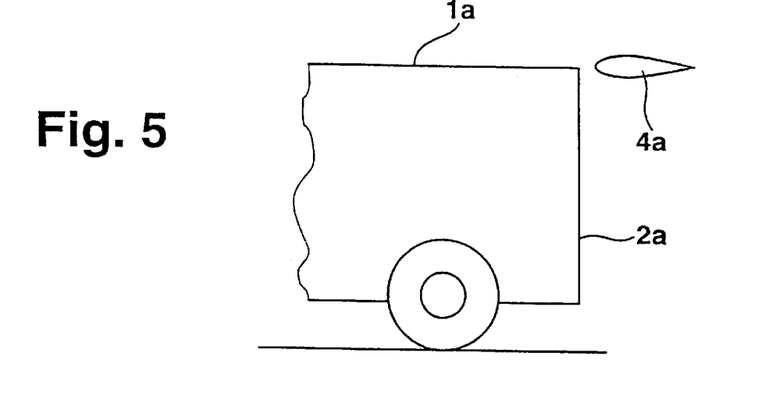
FIG. 5 schematically depicts a trunk area of another embodiment of a motor vehicle according to the invention.

In the embodiment according to FIG. 5, a spoiler 4a that corresponds to spoiler 4 in FIGS. 1 and 2 is provided on a blunt area of a motor vehicle 1a in the form of a commercial vehicle, said spoiler 4a extending over at least a portion of the width of the vehicle. Spoiler 4a is located as a flow-influencing means movably on trunk area 2a of the motor vehicle 1a so that it can perform periodic movements. The periodic movement can be produced by a pivoting movement or by a parallel upward and downward movement of spoiler 4a. Depending on the desired movement of spoiler 4a, the latter is mounted so that it is linearly movable or pivotably movable. The exciting frequency to activate corresponding periodic movements of spoiler 4a is a function of the road speed.

Figure 6:
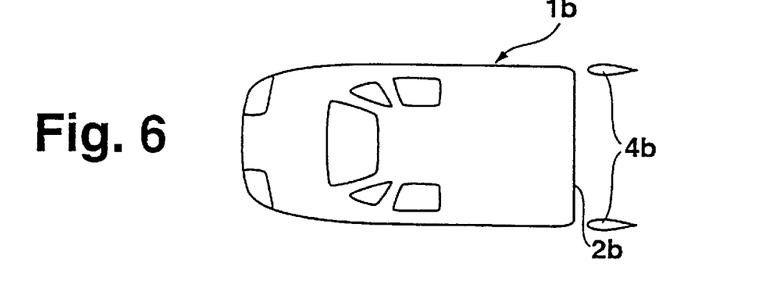
FIG. 6 is a schematic top view of another embodiment of a motor vehicle according to the invention.
Figure 7:
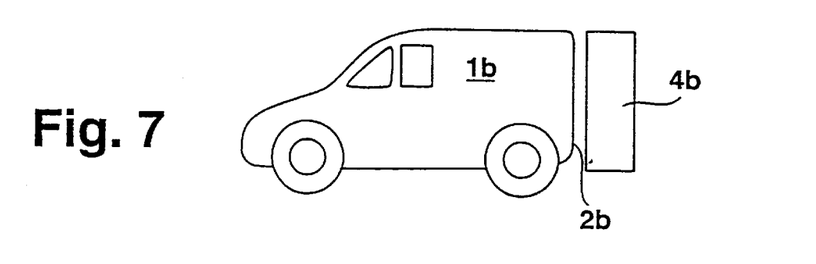
FIG. 7 is a side view of the motor vehicle in FIG. 6.

In another embodiment motor vehicle 1b according to FIGS. 6 and 7, spoilers 4b are located on opposite lateral outer edges of trunk area 2b. These two spoilers 4b are likewise periodically activated and moved, in phase or out of phase. Spoilers 4b can also be located in a partial area of the height of the vehicle or over the entire height of the vehicle.

Figure 8:
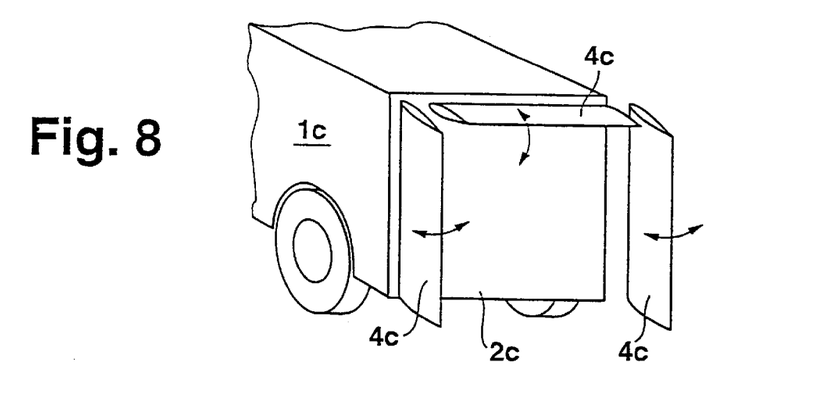
FIG. 8 is a perspective view of a trunk area of another embodiment of a motor vehicle according to the invention.

A motor vehicle 1c according to FIG. 8 in its trunk area 2c has a total of three spoilers 4c which are movable as active flow-influencing means similarly to the embodiments described earlier. A spoiler 4c according to the embodiment in FIG. 5 is located horizontally at the transition area between the roof area and the trunk area. Other spoilers are located like spoilers 4b in FIGS. 6 and 7 on opposite sides on the outer edges of trunk area 2c.

Figure 9:
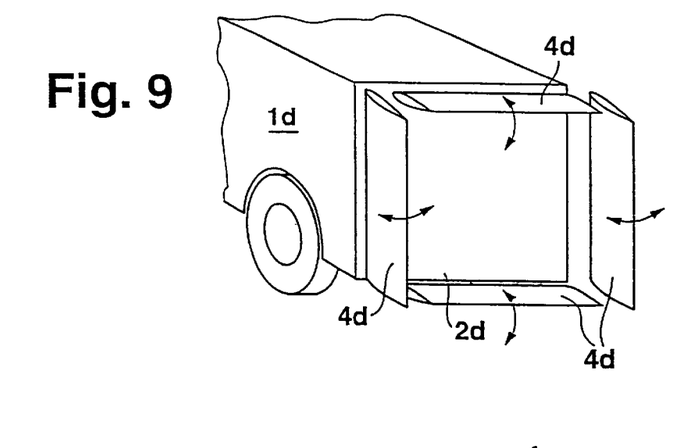
FIG. 9 is a view similar to FIG. 8 of another embodiment of a motor vehicle according to the invention.

In the embodiment in FIG. 9, in the trunk area 2d of a motor vehicle 1d, in addition to the three spoilers according to FIG. 8, an additional spoiler is located at the transition between the vehicle floor and trunk area 2d. All four spoilers 4d are movable in various versions either in or out of phase, whereby as the result of correspondingly staggered activations of spoilers 4d, circulating disturbances in the wake flow of motor vehicle 1d can be produced in trunk area 2d. Oscillating disturbances depending on the design of the phases between the activations and periodic movements of spoilers 4d can be introduced into the wake flow.

Figure 10:
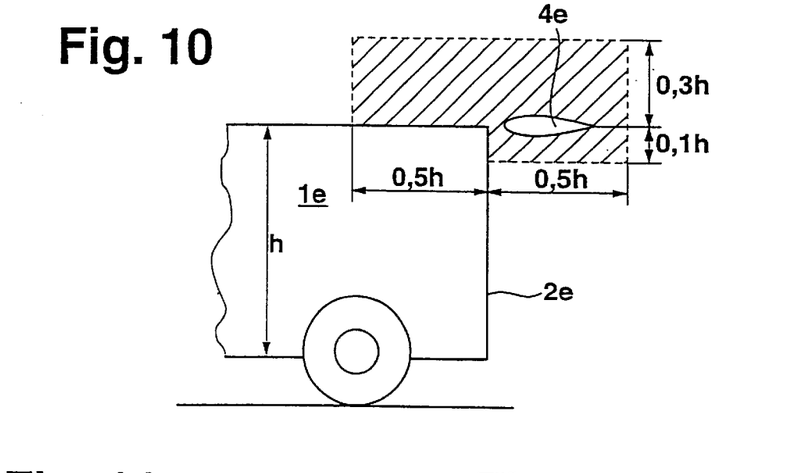
FIG. 10 is a schematic view of a trunk area of another embodiment of a motor vehicle according to the invention with a shaded mounting area for at least one air guide element serving as a flow-influencing means.

In the embodiments described previously the spoilers were provided as extensions of the respective edges of trunk area 2d. Advantageously, a corresponding spoiler 4e that can be activated periodically can be provided in a larger shaded area according to FIG. 10 by means of corresponding mounts relative to area 2e. The shaded mounting area extends lengthwise of the vehicle beyond the vehicle height h while half of the mounting area extends forward from hatchback 2e in the lengthwise direction of the vehicle and the other half of the mounting area extends rearward in a lengthwise direction of the vehicle. The advantageous mounting area for a corresponding spoiler 4e or an active flow-influencing means with a different shape also extends from the edge of the trunk at the transition between the roof area and trunk 2e downward 0.1 times the height of the vehicle h and upward 0.3 times the height of the vehicle h in the vertical direction of the vehicle.

Figure 11:
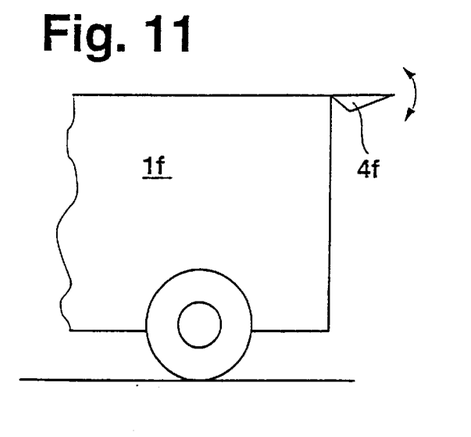
FIG. 11 is a schematic view of a trunk area of another embodiment of a motor vehicle according to the invention.
Figure 12:
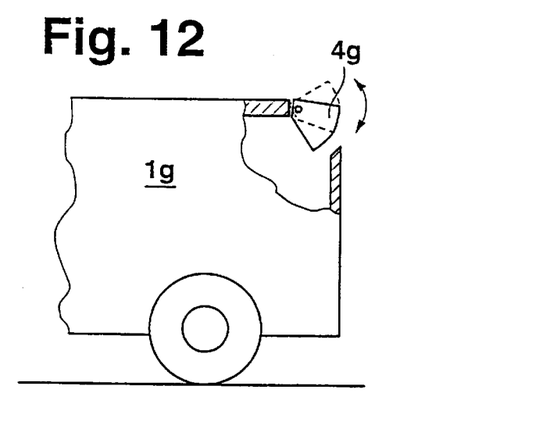
FIG. 12 is another embodiment of a motor vehicle according to the invention, similar to that in FIG. 11.
Figure 13:
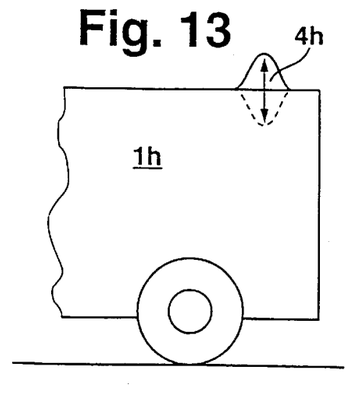
FIG. 13 to FIG. 16 show, four additional embodiments of motor vehicles according to the invention in identical side views.
Figure 14:
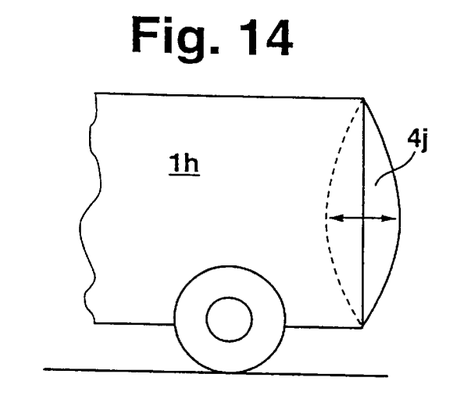
Figure 15:
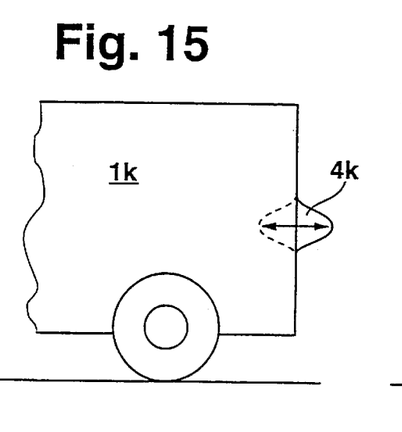
Figure 16:
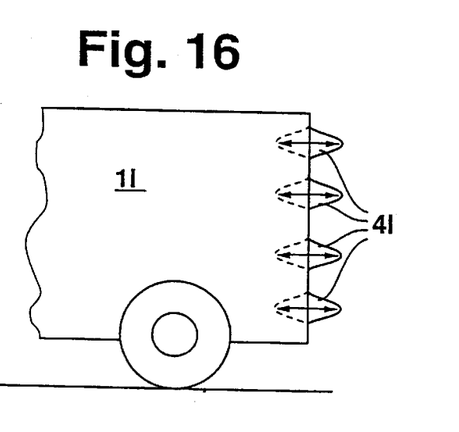

Instead of spoilers in the embodiments in FIGS. 5 to 10, periodically movable spoilers 4f, 4g are provided in other motor vehicles 1f, 1g according to FIGS. 11 and 12 that excite the disturbances in the wake flow.

Instead of dimensionally stable flow-influencing means in the form of air guide profiles, air guide flaps, air guide edges and the like which are mounted periodically movably, it is also possible to use as active flow-influencing means according to FIGS. 13 to 16, flexible membranes 4h, 4j, 4k, and 4l that cover corresponding air suction and injection openings and are inflated outward or drawn inward by corresponding air ejection and suction devices located inside the vehicle. Suitable suction and injection devices can be made similar to the device in FIG. 4. In addition, membranes 4h to 4l are moved periodically in the direction of the arrows as a function of the road speed, being pushed outward or drawn inward at specific frequencies. Membranes 4h to 4l cover corresponding air injection and suction openings that seal them airtight. In a corresponding drive unit and an air suction and ejection device according to FIG. 4, an air cushion is pushed outward or drawn inward alternately, producing the movement of membranes 4h to 4l. Membranes 4h to 4l can have a large or small area, or can be made narrow, whereupon only a single membrane or several membranes are provided at appropriate locations serving the wake flow. In an embodiment in FIG. 13 a membrane 4h extends over the entire width of the vehicle in front of a trunk edge in the roof area which thus in addition to disturbing the wake flow also disturbs corresponding wall boundary layers in the flow around the vehicle. In motor vehicle 1h according to FIG. 14 a membrane 4j extends over the entire surface of the motor vehicle trunk. In motor vehicle 1k according to FIG. 15, a smaller membrane 4k is provided at an eddy on the motor vehicle trunk. Motor vehicle 11 according to FIG. 16 has in its trunk area a plurality of membranes 41 distributed over the trunk area. The membranes are preferably at least largely arranged transversely to a main flow direction of the headwind flow around the automobile.

Depending on in-phase or out-of-phase control of the membranes, continuous waves can be produced on the trunk area.

Figure 17:
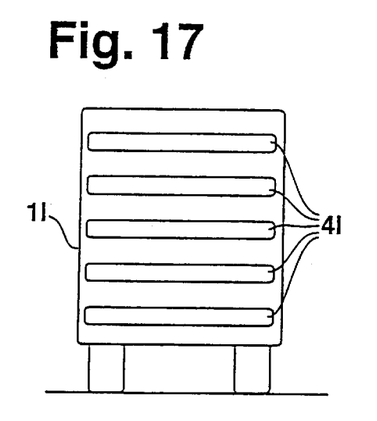
FIG. 17 is a rear view of another embodiment of a motor vehicle according to the invention and provided with elongate and parallel blowing and sucking membranes.
Figure 18:
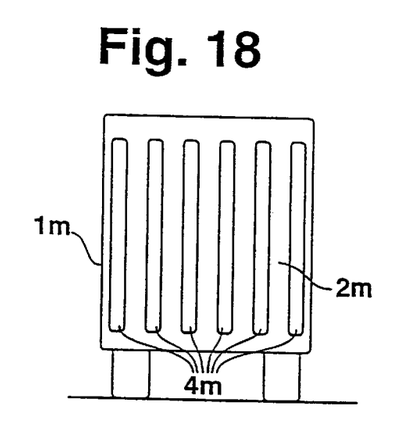
FIG. 18 is another rear view of a motor vehicle similar to FIG. 17 in which the membranes are aligned vertically and parallel to one another.
Figure 19:
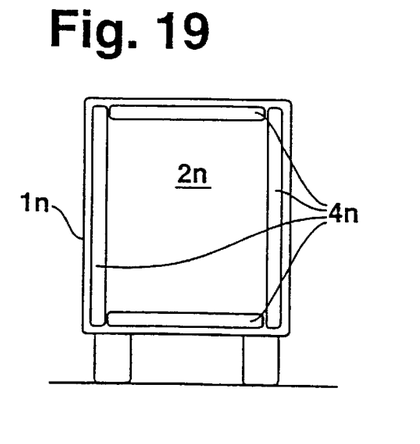
FIG. 19 is a rear view of another embodiment of a motor vehicle according to the invention in which the membranes are located in the marginal area of the trunk area and surrounding it.
Figure 20:
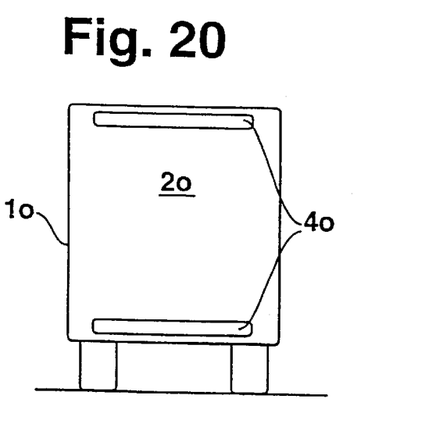
FIG. 20 is another embodiment of a motor vehicle according to the invention similar to FIG. 20.
Figure 21:
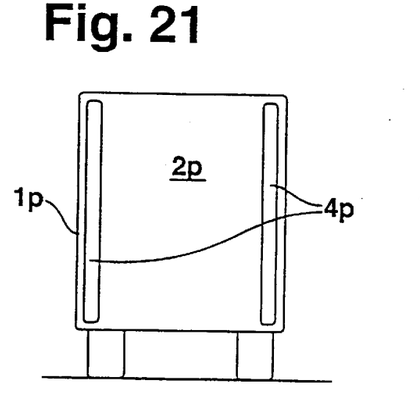
FIG. 21 is another embodiment of a motor vehicle according to the invention similar to FIGS. 19 and 20.

In the embodiment according to FIG. 17, membranes 41 are likewise provided for a trunk of motor vehicle 11 that extend horizontally like stripes over the surface of the trunk area. These membranes 41 however are air-permeable and provided with corresponding lengthwise slots or perforations with other shapes. In addition to the movement of membranes 41 themselves, in this embodiment the disturbance of the wake flow is produced by corresponding ejection or suction processes of the air flow that are also activated periodically. Alternatively, it is also possible not to use flexible membranes but only air ejection or suction slots or ejection and/or suction openings of other shapes. The corresponding periodic air flow ejection and/or suction processes are used directly as the flow-influencing means that are activated periodically.

In the embodiments according to FIGS. 18 to 21, motor vehicles 1m to 1p in their trunk areas 2m to 2p have lengthwise slots to produce alternating air ejection and suction processes. The lengthwise slots 4m to 4p are integrated in trunk area 2m to 2p into the outer contour of the motor vehicle and provided with corresponding flow channels with suitable pumping devices that serve as drive means.

Figure 22:
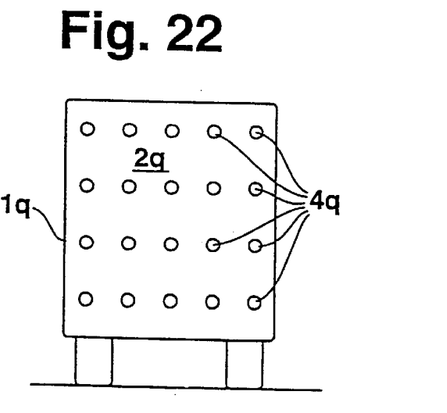
FIG. 22 is a rear view of another embodiment of a motor vehicle according to the invention with the trunk area being provided with air blowing and sucking openings.

In the embodiment according to FIG. 22, a plurality of round openings 4q are provided as air suction and ejection openings in trunk area 2q of motor vehicle 1q that communicate with the matching flow channels or lines. Membranes can be provided in the embodiments according to FIGS. 18 to 22 as well, which cover the openings in an air-permeable manner or tightly.

In addition to the ejection or suction described, which takes place in a mass-neutral fashion in a time average through a piston-like drive it is also possible to produce the ejection and/or suction by a net mass flow, with a pulsation being superimposed on a continuous volume flow.

Figure 23:
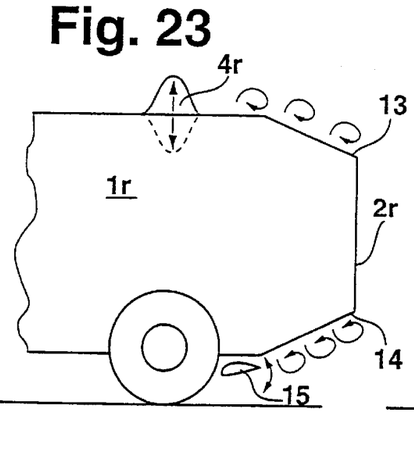
FIG. 23 is another embodiment of a motor vehicle according to the invention with upper and lower trunk intakes.
Figure 24:
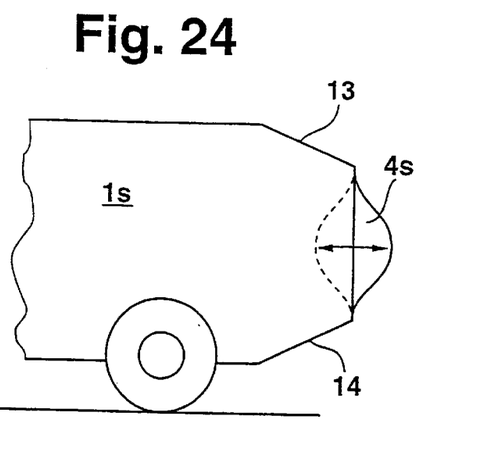
FIG. 24 is another embodiment of a motor vehicle according to FIG. 23.
Figure 25:
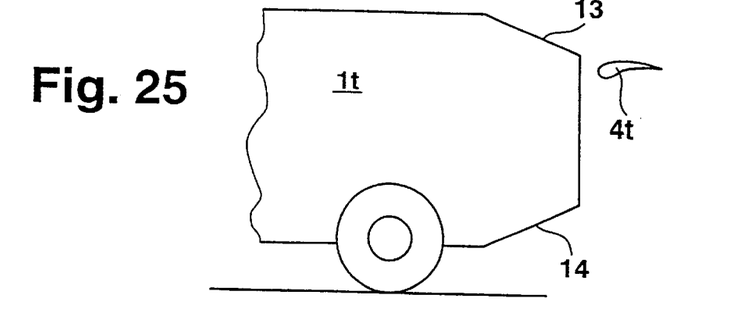
FIG. 25 is a motor vehicle similar to FIGS. 23 and 24.

In the embodiments according to FIGS. 23 to 25, active flow-influencing means 4r, 4s, and 4t are associated with motor vehicles 1r, 1s, and lt as described in the case of the embodiments above. In the embodiments according to FIGS. 23 to 25, these active flow-influencing means are combined by passive flow-influencing structure in the form of upper and lower trunk constrictions 13, 14. In the embodiment according to FIG. 23, at the transition between the vehicle floor and trunk constriction 14, an additional spoiler 15 is provided that is likewise periodically movable. Advantageously, corresponding active flow-influencing means 4r, 15 are located in an area upstream of trunk 13, 14 that corresponds in length to approximately half the height of the vehicle.

Figure 26:
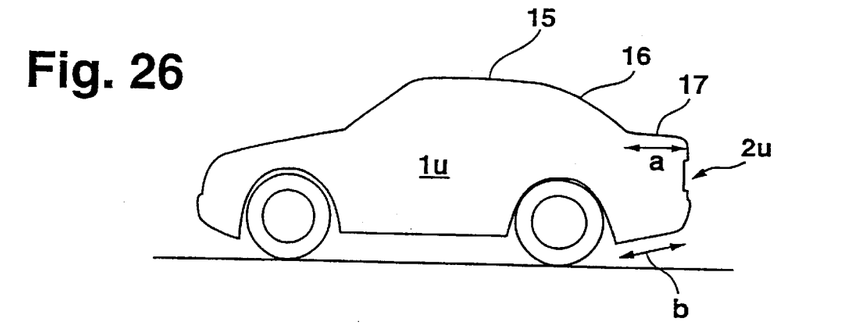
FIG. 26 is a motor vehicle in the form of a notchback automobile that has various areas for possible mounting of flow-influencing means.
Figure 27:
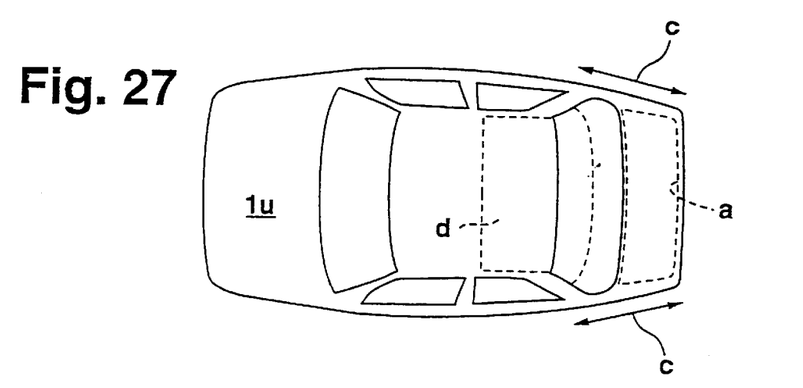
FIG. 27 is a t op view of the automobile in FIG. 26.
Figure 28:
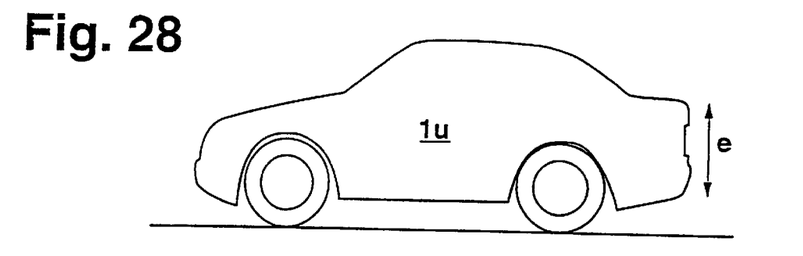
FIG. 28 shows the automobile in FIGS. 26 and 27 with an additional mounting area for flow-influencing means.

The active flow-influencing devices and structure described previously and periodically movable as well as possibly combined with passive steady-state flow guide structure can also be provided in notchback vehicles 1u according to FIGS. 26 to 28; in order to prevent premature flow separations, roof area 15, rear window area 16, trunk lid area a at the level of trunk lid 17, and vehicle floor area b as well as lateral trunk constricted areas c are provided. The rear window area d is located at the transition between roof area 15 and rear window 16 according to FIG. 27. A suitable arrangement of flow-influencing means is also provided in trunk area e according to FIG. 28. Corresponding active and passive flow-influencing means can be positioned alternately or cumulatively in these areas.

The flow-influencing means described above can be part of a device for reducing air resistance in motor vehicles that is installed in suitable fashion in a motor vehicle or added to a motor vehicle. This device is an independent unit made separately from the motor vehicle which can be connected with the motor vehicle after the latter has been built. In the embodiments described previously, however, the parts of such a device were integral components of the motor vehicle which have already been taken into account when manufacturing and designing the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
    an outer contour having associated with it flow-influencing devices capable of reducing an air resistance of the motor vehicle;
    wherein the flow-influencing devices comprise ejection and suction devices having ejection and suction openings integrated in the outer contour;
    wherein the flow-influencing devices are periodically activated by drive devices having a control unit in order to introduce time-dependent disturbances under control into a flow around the outside of the motor vehicle.

* * * * *